UNITED STATES PATENT OFFICE.

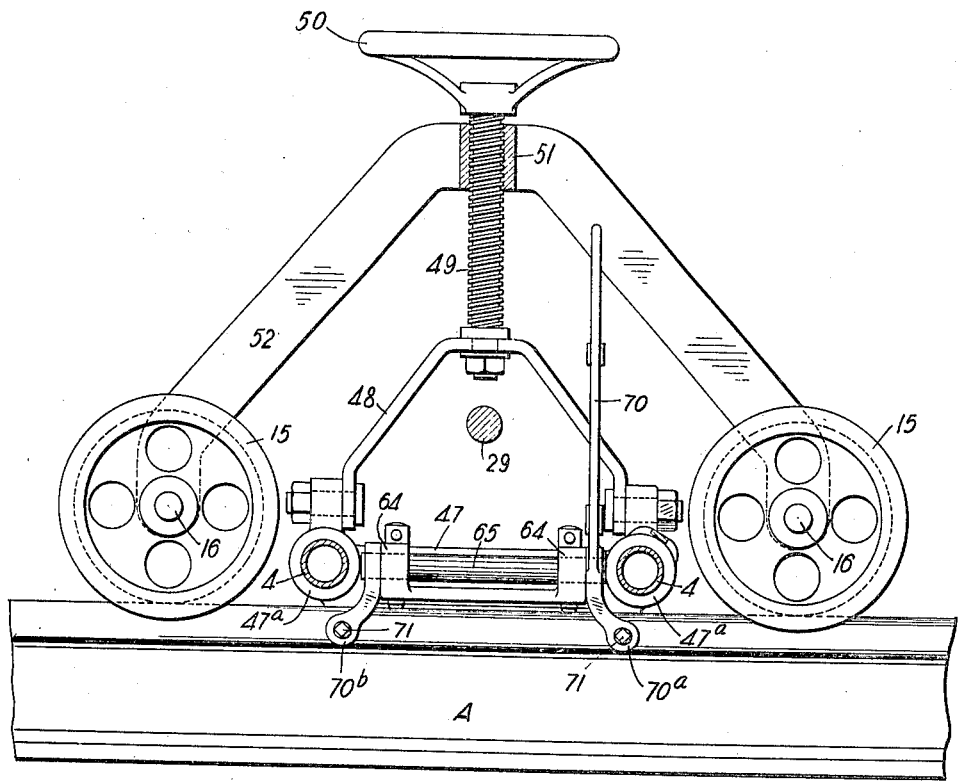
FIG. 3
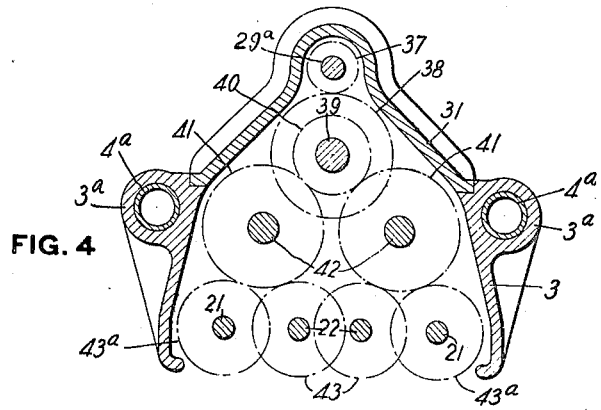
FIG. 4
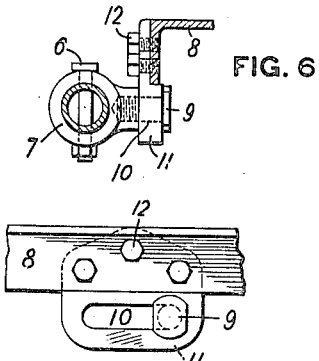
FIG. 6
FIG. 5

CHARLES R. STURDEVANT AND ARTHUR L. BENOIT, OF WORCESTER, MASSACHUSETTS, ASSIGNORS TO THE AMERICAN STEEL & WIRE COMPANY OF NEW JERSEY, OF HOBOKEN, NEW JERSEY, A CORPORATION OF NEW JERSEY.

MULTIPLE DRILL.

1,126,313.  Specification of Letters Patent.  Patented Jan. 26, 1915.

Application filed July 20, 1912. Serial No. 710,610.

*To all whom it may concern:*

Be it known that we, CHARLES R. STURDEVANT and ARTHUR L. BENOIT, citizens of the United States, residing at Worcester, in the county of Worcester and State of Massachusetts, have invented a new and useful Multiple Drill, of which the following is a specification.

Our invention relates to multiple spindle drilling machines and, while not restricted to such uses, more particularly relates to the construction and arrangement of portable multiple drilling machines adapted for use in drilling the holes for rail bonds in the rails of a railway track.

One object of our invention is to provide a multiple spindle drilling machine having novel means by which the drill spindles are driven, whereby the spindles and drills are fed lengthwise in the drilling operations, and by which the drills are positioned and are moved and held in position on the rails in the drilling operations.

Another object of our invention is to provide a portable drilling machine having improved means whereby the removal from and insertion of the drills in the drill sockets is facilitated, and whereby the removal of the drilling machine from place to place after the successive drilling operations is accomplished.

A further object of this invention is to provide a portable drilling machine having a driving mechanism adapted for use in driving a one, two, or more spindle machine, and a machine having novel means whereby drill frames with varying numbers of drill spindles and spindles at varying spaced apart intervals are easily and quickly removed and replaced in position on the truck frame of the machine in readiness for use.

Still further objects of the invention will appear as the invention is more fully described and claimed hereinafter.

Figure 1:
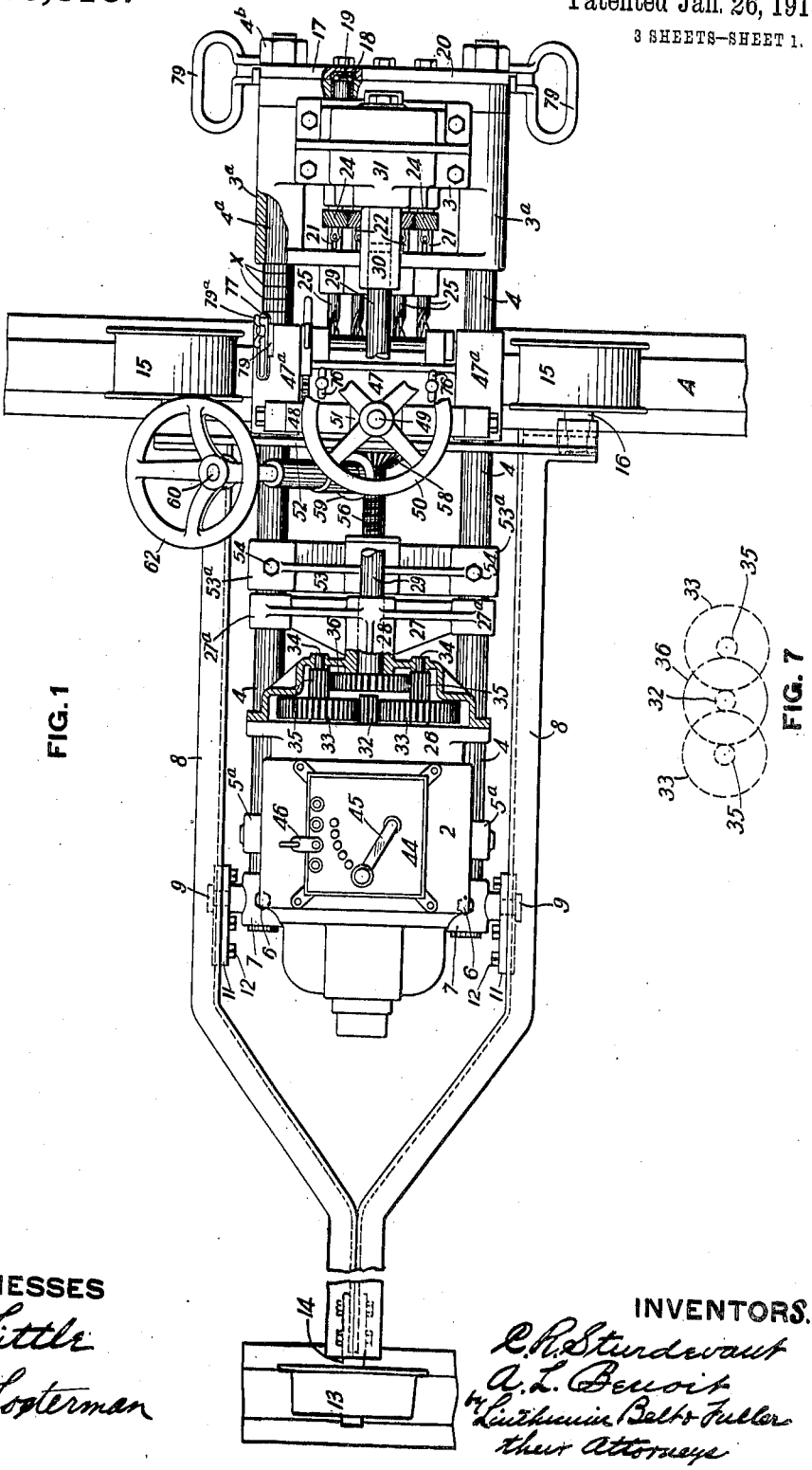
Figure 2:
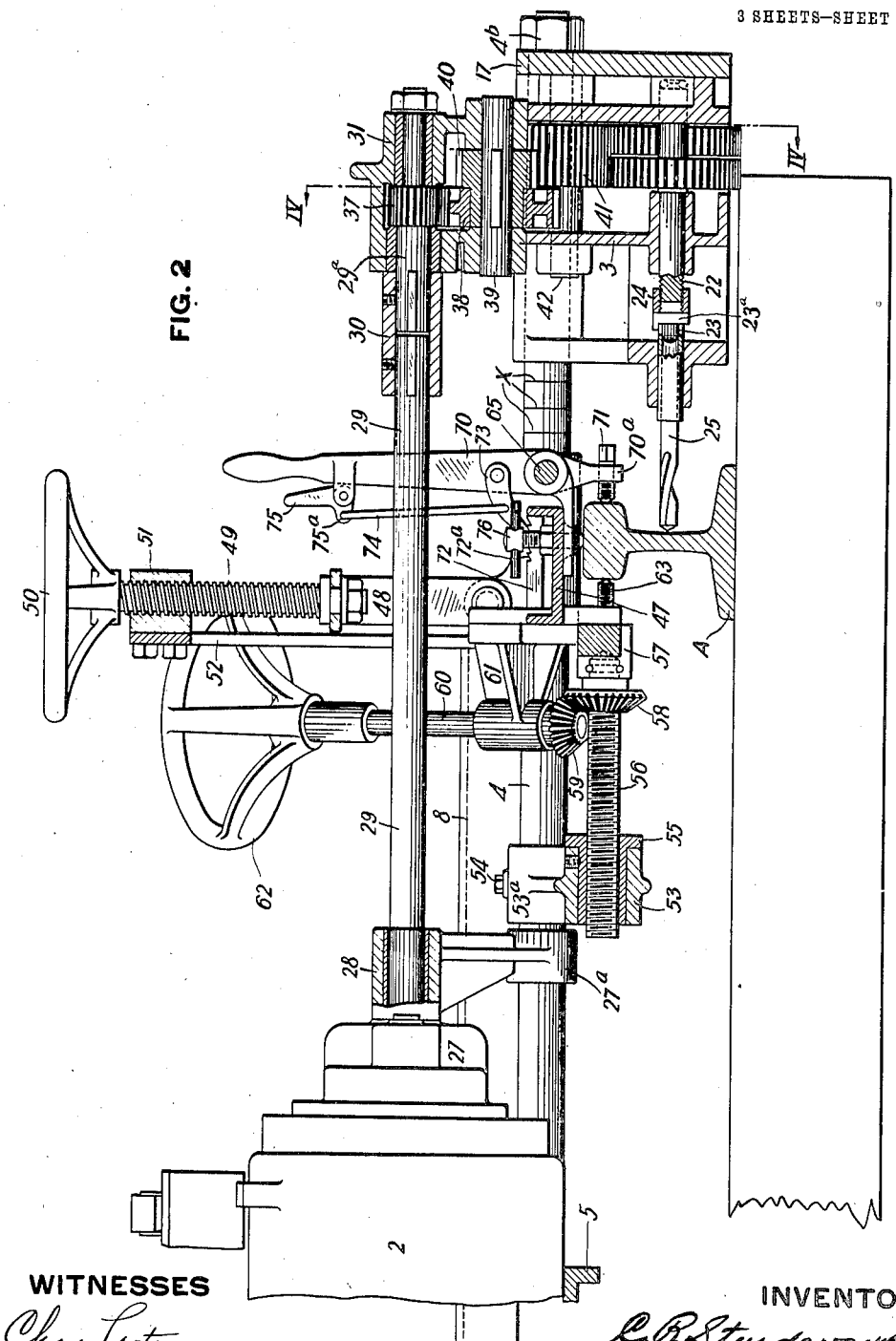

Referring to the accompanying drawings forming part of this specification, Figure 1 is a plan, partly in section, showing a portable multiple spindle drilling machine constructed and arranged in accordance with our invention. Fig. 2 is a side elevation, partly in section, of the apparatus shown in Fig. 1. Fig. 3 is a sectional end elevation showing the adjusting mechanism by which the drilling mechanism is raised and lowered and the clamping mechanism for holding the drilling machine in position during the drilling operations. Fig. 4 is a detail sectional elevation, on the line IV—IV of Fig. 2, showing diagrammatically the arrangement of the slow-down gears in the gear frame operatively connecting the transmission shaft to the drill spindles. Fig. 5 is a detail side elevation, and Fig. 6 a sectional end elevation showing the sliding pivot connection by which the rear end of the drilling machine is adjustably secured to the wheeled truck frame. Fig. 7 is a diagrammatic elevation showing the arrangement of the slow-down gears operatively connecting the driving motor armature shaft to the transmission shaft.

In the drawings the numeral 2 designates a driving motor, preferably of the variable speed type, and 3 a drill frame which are mounted on opposite ends of two parallel guide rods 4, 4, the slightly reduced end portions 4ª (see Fig. 1) of these rods extending through suitable openings in the bosses 3ª on the drill frame 3, which is secured in place on the rods 4 by nuts 4ᵇ on the screw threaded outer ends of the reduced portions of the rods. The rods 4 also extend through openings in the bosses 5ª of the yoke 5 which supports the motor 2, the motor being rigidly secured to the yoke 5 by means of fastening bolts.

Fastened by bolts 6 on the motor end of the guide rods 4, 4 forming the support for the motor 2 and drill frame 3 are pivot pin brackets 7, 7 by which the supporting guide rods 4, 4 are adjustably secured to the three wheeled truck frame 8 at an intermediate point in its length so as to be angularly and longitudinally adjustable. The brackets 7 on the guide rods 4 are connected to the truck frame 8 by means of studs forming pivot pins 9 which are arranged to extend through and move in elongated openings or slots 10 in bracket bearings 11 rigidly secured by cap bolts 12 to the truck frame 8 so as to project downwardly below the under side of the frame 8.

From the foregoing it will be readily seen that the drill frame 3 has the motor 2 and the drills mounted thereon and is pivotally secured on the truck frame 8 so as to permit the swinging end of the drill frame to be tilted to bring the drills above the level of the top of the rail A and permit ready inspection and adjustment or replacement of the drills without bodily lifting the motor 2. The motor is of considerable weight, and the drill frame is pivoted to the truck frame at a point beneath the motor so that the exertion or power required to tilt the drill frame to move the drills into and out of drilling position is lessened and reduced to a minimum. As quickness of adjustment is an essential advantage in the operation of such portable drills, this feature forms an important part of our invention. By pivotally mounting the drill frame on the truck frame with the motor and drills supported on the truck frame, a tilting movement is obtained and the use of a straight line drive is made possible and the use of a universal joint or equivalent device is rendered unnecessary.

A flanged truck wheel 13 is rotatably mounted on the stud 14 forming the axle for the wheel 13 which is positioned on one end of the truck frame 8, and a pair of truck wheels 15, 15 are rotatably mounted on similar studs 16 which are secured on opposite sides of the other or drill frame end of the truck frame 8 to form axles for the wheels 15, which wheels engage and travel on the track rail drilled by the drilling machine.

The rear or outer end of the drill frame 3 is provided with a bearing plate 17 having openings therein through which the rear end of the driving spindles project so as to be in engagement with the balls 18 in the cups 19 which are located in the recesses provided therefor in one face of the thrust plate 20 also on the outer or rear end of the drill frame 3 (see Fig. 1).

The rotary drill spindles 21, 21 and 22, 22 are mounted in the drill frame 3 with the socket ends of the spindles projecting through suitable bosses on the inner end of the drill frame. The socket ends of the drill spindles are provided with transverse slots 23 at the inner ends of the axial recesses forming the drill sockets and the screw threaded surface of the spindles adjacent to the transverse slots have knurled adjusting nuts 24 secured thereon whereby each of the drills 25 is adjusted lengthwise relative to its spindle to bring all of the drill points into alinement, so as to thereby simultaneously drill a series of holes to exactly the same depth in the rails A.

The driving motor 2 is provided with a back bearing cover 26 which is connected to the gear housing 27 and the gear housing 27 is provided with bosses 27ª, 27ª having openings therein through which the guide rods 4 extend. A bearing 28 is provided on the gear housing 27 for the transmission shaft 29 which is connected at one end to the slow-down gears in the gear housing 27, and, at its opposite end, by a sleeve coupling 30 to the drive shaft for the slow-down gears in the gear housing 31 on the drill frame 3.

On one end of the armature shaft of the motor 2 is a spur driving pinion 32 which meshes with the spur gears 33, 33 in the gear housing 27. The spur gears 33 are formed integrally on or are keyed to shafts 34 which have driving pinions 35 thereon, and the pinions 35 mesh with the driving gear 36 on one end of the transmission shaft 29.

The opposite end of the transmission shaft 29 is connected by the sleeve coupling 30 with a pinion shaft 29ª which is mounted in bearings in the transmission box or gear housing 31 on the drill frame 3.

A pinion 37 on the shaft 29ª meshes with the spur gear 38 on the idler shaft 39 mounted in bearings in the gear housing 31 and the idler spur pinion 40 on the shaft 39 meshes with each of the intermediate gears 41, 41 on the idler shafts 42, 42. Each one of the gears 41 in turn meshes with one of the driving pinions 43 for the inside drill spindles 22 and with one of the driving pinions 43ª on the outside drill spindles 21, (a four spindle drilling machine being shown in the drawings).

A rheostat or controller 44 having an operating lever 45 is conveniently mounted on top of the motor 2 and is provided with a connecting post 46 by which a trolley terminal bushing is connected to the motor through the rheostat.

A feed bracket 47 is provided with bosses 47ª having openings therein through which the guide rods 4 extend so as to be lengthwise movable relative to the bracket 47. The bracket 47 is also connected by means of a raising yoke 48 to the lower end of a rotary raising screw 49 by which the drill frame 3 is moved angularly with respect to the truck frame 8 to facilitate the removal and reinsertion of the drills and to enable the ends of the drills to clear the rails and splice bars connecting the rails when moving the machine from place to place on the railway track.

The threaded portion of the screw 49, which is provided on its upper end with a hand wheel 50, extends through the threaded nut 51 secured on the top of the U-shaped yoke 52 and the yoke or bracket 52 is fastened by its lower ends to the drill frame end of the truck frame 8, the studs 16 forming the axles or pins for the truck wheels 15 serving also to secure the yoke 52 to the frame 8.

A feed yoke 53, having bosses 53ª, 53ª on its ends through which the parallel guide rods 4, 4 extend, is rigidly secured on the guide rods by means of through bolts 54, and in the middle of the length of the yoke 53 a feed nut 55 is mounted through which the feed screw 56 extends. The feed screw 56 is secured by one end in the holder 57, which is fastened to the under side of the feed bracket 47, so as to be rotatable therein. A bevel gear 58 is keyed or otherwise secured on one end of the screw 56 which meshes with the bevel gear 59 on the lower end of the angularly extending feed wheel shaft 60 which is mounted in the removable bracket bearing 61 on the side of the feed bracket 47. A hand wheel 62 on the upper end of the angularly extending shaft 60 provides means for actuating the feed screw to adjust the drilling mechanism longitudinally on the truck frame 8.

A series of adjusting screws 63 extend horizontally through the holder 57 on the under side of the bracket 47 and have pointed ends which engage with one side of the rail head, in positioning and clamping the drilling machine in position on the track rails, when the drilling machine is in operation. Also secured to the under side of the feed bracket 47 are the bearings 64, 64 for the rock shaft 65 on which the hand operated clamping lever 70 is secured. The clamping lever 70 having a clamping dog 70ᵃ on its lower end, and the short clamping dog 70ᵇ are pinned or keyed to the shaft 65 and the lower end of the clamping dogs 70ᵃ, 70ᵇ have adjustable screws 71 thereon, the pointed ends of which engage with the rail head on the side opposite to that with which the adjustable clamping screws 63 engage. By a suitable adjustment of the opposite set screws 63 and 71, the clamping mechanism is adapted to engage with and fasten the drilling machine in position on track rails 4 of varying widths of head.

Fastened on the upper face of the feed bracket 47 is a horizontal pawl rack 72 having a series of ratchet teeth 72ᵃ in its upper face, and pivoted by one end to the clamping lever 70 is a pawl 73 having its swinging lower end arranged to engage with one or another of the ratchet teeth 72ᵃ in the rack 72 in clamping the machine to the track rails. The pawl 73 is operatively connected by the bent ends of the reach rod 74 with one arm 75ᵃ of the bell crank forming the releasing lever 75 which is pivoted to the upper or handle end of the clamping lever 70. Adjusting screws 76 extending vertically through the feed bracket 47 with their lower ends in engagement with the top surface of the track rail A are provided for adjusting the drilling machine vertically relative to the track rails operated upon by the drills.

A depth gage 77 is adjustably secured on one boss 47ᵃ of the feed bracket 47 by means of a thumb nut 79ᵃ the ribs 78 on the boss 47ᵃ forming a slide for the gage 77 and a series of circumferential marks X are scored on the adjacent guide rod 4 to provide an indicator or guide by which the depth to which the holes are drilled in the heads of the rails is indicated.

The thrust plate 20 has ears on its ends to which handles 79 are secured by which the apparatus is readily moved as required.

In the operation of a drilling machine constructed as shown and described, the machine is mounted with the track wheels 13 and 15 of the truck frame 8 on the rails of a railway track, the wheels 15 being placed on the rail to be drilled. The machine is then moved on the rails until positioned at the exact point in the length of the rails at which the holes are to be drilled and the adjusting screws on the frame 47 are then turned to adjust the drill frame and drills 25 vertically. The set screws 63 having been adjusted so as to extend forwardly the desired distance and to be in alinement and the adjusting screws 71 on the clamping jaws 70ᵃ, 70ᵇ of the lever 70 having been set in position to suit the width of the rail head, the lever 70 is then moved to rock the shaft 65 and dogs 70ᵃ, 70ᵇ thereon and cause the rail head to be tightly gripped by the opposing sets of screws 63 and 71. The pawl 73 by engagement with one or another of the teeth 72ᵃ in the rack 72 operates to fasten the drilling machine in the desired position on the rail. The drills 25 are then caused to move lengthwise toward the rail head by rotating the hand wheel 62 which, through the bevel gears 58 and 59, turns the adjusting screw 56 in the adjusting nut 55 on the bracket 53. The adjusting nuts 24 on the drill spindles 21 and 22 are then rotated on the screw threaded portions of the spindles to move the drills 25 lengthwise in their sockets and bring the drill points into alinement so each drill will engage the rail at the same time. By turning the nuts 24 on the spindles the keys 23ᵃ in the transverse slots 23 engage with the tang of the drill shanks and move the drills lengthwise in the drill sockets. The adjusting nuts 24 on the spindles 21 and 22 should be kept well back so as to afford the longest possible driving seats for the shanks of the drills in the spindle sockets. The gage 77 on the boss 47ᵃ is then set to register with one of the index marks X on the guide rods 4, and the marks on this guide rod being graduated to known distances, the depth of holes drilled will be known by noting the distance the gage travels relative to the marks on the guide rod. The motor 2 is then started by attaching a trolley bushing to the connecting post 46 on the rheostat 44 and by turning the starting lever 45 on the rheostat the motor 2 is caused to rotate at the desired speed. The drills 25 which are thereby caused to rotate are then fed inwardly by means of the hand wheel 62 until the holes are drilled to the desired depth. The drills are backed out of the holes by means of the hand wheel 62 until their ends are clear of the side of the rail head. The motor is then stopped, and the pawl 73 is lifted when the clamping lever 70 is moved so as to release the clamping dogs 70ª, 70ᵇ and disengage the drilling machine from the track rail. The hand wheel 50 is then rotated to turn the raising screw 49 so as to lift the drilling mechanism relatively to the truck frame 8 until the points of the drills 25 are above the top of the rail A. In this lifting movement the drilling machine will swing or tilt on the studs 9 by which the drilling mechanism, at the motor end thereof, is pivotally connected to the truck frame 8. The drilling machine is then moved by means of the truck wheels 13 and 15 from one point to another on the railway track at which holes are to be drilled in the rails.

When the drills are being fed forwardly in drilling holes in the track rails the motor 2, drill frame 3, and the connecting guide rods 4 with the parts fixed thereto will move lengthwise with the guide rods 4 relative to the then stationary truck frame 8 and the feed bracket 47 which is rigidly secured in place on the ball of the rail. The studs 9 by which the inner or motor end of the guide rods 4 are movably secured to the truck frame 8 sliding in the slots 10 in the slide brackets 11 (see Fig. 5).

The advantages of our invention will be apparent to those skilled in the art.

A portable drilling machine is provided which can be easily and quickly transported from one point to another in drilling the rails of a railway track.

Drill frames having a different number of drill spindles are readily substituted for the one shown on the guide rods.

The drills are readily removed and replaced in the sockets of the spindles without removing the drilling machine from the rails of the track.

The multiple spindles of the drilling machine are quickly adjusted relative to the rails to be drilled and the machine is quickly clamped in position on the track.

The apparatus can be adjusted to suit various sizes of rails and the clamping and adjusting mechanism can be adjusted to suit varying conditions and sizes of rail heads.

The apparatus is simple and is easily kept in repair.

A multiple spindle drill is provided which is positively driven by a direct shaft connection.

Modifications in the construction and arrangement of the parts may be made without departing from our invention as defined in the appended claims.

We claim:

1. A portable drilling machine comprising in combination, a wheeled truck frame, a movable spindle carrying drill frame mounted on said truck frame, said spindle having drills removably secured thereto, coacting means on the truck frame and drill frame to adjust the drill frame and drills lengthwise relative to the truck frame, means for adjusting the drills on said drill frame and power mechanism carried on the drill frame for rotating the drill spindles.

2. A portable drilling machine comprising in combination a wheeled truck frame, an angularly movable spindle carrying drill frame mounted on said truck frame, said spindles having drills removably secured thereto, means on the truck frame to adjust the drill frame and drills thereon angularly relative thereto, and power mechanism carried on the drill frame for rotating the drill spindles.

3. A portable drilling machine comprising in combination a wheeled truck frame, an angularly movable spindle carrying drill frame mounted on said truck frame, said spindles having drills removably secured thereto, means on the truck frame to adjust the drill frame angularly relative thereto, said means being adapted to hold the drill frame in adjusted position on the truck frame, and power mechanism carried on the drill frame for rotating the drill spindles and drills.

4. A portable multiple spindle drilling machine comprising in combination a truck frame having truck wheels thereon, a drill frame having a plurality of horizontal drill spindles, guide rods connecting said drill frame to the truck frame, said guide rods and drill frame being angularly and lengthwise movable on said truck frame, a spindle driving motor mounted on said guide rods and movable angularly and lengthwise therewith, and a transmission shaft connecting the drill spindles on said drill frame with said motor.

5. A portable multiple spindle drilling machine comprising in combination a truck frame having truck wheels thereon, a drill frame having a plurality of horizontal drill spindles, guide rods connecting said drill frame to the truck frame, said guide rods and drill frame being angularly and lengthwise movable on said truck frame, a spindle driving motor mounted on said guide rods and movable angularly and lengthwise therewith, a transmission shaft connecting the spindles on said drill frame and said motor, an adjusting mechanism whereby said spindle carrying frame is adjusted angularly and lengthwise on the truck frame, and means for actuating said adjusting mechanism.

6. A portable multiple spindle drilling machine comprising in combination a truck frame having truck wheels thereon, a drill frame having a plurality of horizontal drill spindles, guide rods connecting said drill frame to the truck frame, said guide rods and drill frame being angularly and lengthwise movable on said truck frame, a spindle driving motor mounted on said guide rods and movable angularly and lengthwise therewith, a transmission shaft connecting the spindles on said drill frame and said motor, an adjusting mechanism between the frame and motor whereby said spindle carrying frame is adjusted angularly and lengthwise on the truck frame, and means for actuating said adjusting mechanism.

In testimony whereof, we have hereunto set our hands.

CHARLES R. STURDEVANT.
ARTHUR L. BENOIT.

Witnesses:
CHAS. W. HOLMES,
GEO. M. BANCROFT.